(12) United States Patent
Voth et al.

(10) Patent No.: US 9,149,974 B2
(45) Date of Patent: Oct. 6, 2015

(54) DEVICE AND METHOD FOR MANUFACTURING CONTAINERS

(75) Inventors: Klaus Voth, Obertraubling-piesenkofen (DE); Stefan Rossmann, Bad Abbach (DE)

(73) Assignee: KRONES AG, Neutraubling (DE)

( * ) Notice: Subject to any disclaimer, the term of this patent is extended or adjusted under 35 U.S.C. 154(b) by 448 days.

(21) Appl. No.: 13/548,465

(22) Filed: Jul. 13, 2012

(65) Prior Publication Data

US 2013/0015611 A1    Jan. 17, 2013

(30) Foreign Application Priority Data

Jul. 15, 2011  (DE) .......................... 10 2011 079 273

(51) Int. Cl.
*B29C 49/42*    (2006.01)
*B29C 49/64*    (2006.01)

(52) U.S. Cl.
CPC ................ *B29C 49/64* (2013.01); *B29C 49/42* (2013.01); *B29C 49/4284* (2013.01)

(58) Field of Classification Search
CPC .................. B29C 49/4284; B29C 2049/4833; B29C 2049/5858; B29C 2049/0094
USPC ....................................................... 425/526
See application file for complete search history.

(56) References Cited

U.S. PATENT DOCUMENTS

| 5,322,651 | A | 6/1994 | Emmer |
| 2008/0127665 | A1* | 6/2008 | Fournier .................... 62/238.1 |
| 2008/0136068 | A1* | 6/2008 | Leone ........................ 264/520 |
| 2009/0230124 | A1 | 9/2009 | Senn |
| 2011/0241265 | A1* | 10/2011 | Schmidt ..................... 264/532 |
| 2011/0260373 | A1* | 10/2011 | Finger et al. ............... 264/532 |

FOREIGN PATENT DOCUMENTS

| CN | 201423749 | Y | | 3/2010 |
| CN | 101791854 | A | | 8/2010 |
| DE | 102009049150 | A1 | * | 4/2011 |
| DE | 102009044258 | A1 | | 5/2011 |
| EP | 2100712 | A2 | | 9/2009 |
| EP | 2186619 | A1 | * | 5/2010 |
| EP | 2208606 | A2 | | 7/2010 |
| EP | 2308667 | A2 | | 4/2011 |
| JP | H04135738 | A | | 5/1992 |
| JP | 2001050045 | A | * | 2/2001 |
| WO | WO 2011045070 | A2 | * | 4/2011 |
| WO | WO 2011045126 | A1 | * | 4/2011 |

OTHER PUBLICATIONS

Partial machine translation of EP2308667A1 dated Apr. 13, 2011.*

(Continued)

*Primary Examiner* — Robert B Davis

(74) *Attorney, Agent, or Firm* — Marshall, Gerstein & Borun LLP

(57) ABSTRACT

A device optimized with regard to thermal management and an optimized method for the manufacture of containers are described in which the thermal energy of a plurality of consumers/generators of thermal energy is interchanged through a thermal energy combination. The device and the method are particularly suitable for stretch blow-molding machines and compressors.

11 Claims, 2 Drawing Sheets

(56) References Cited

OTHER PUBLICATIONS

Partial machine translation of WO2011045126A1 dated Apr. 21, 2011.*
German Search Report for 10 2011 079 273.2, dated Apr. 27, 2012.
The First Office Action, The State Intellectual Property of the People's Republic of China, Application No. 201210246682.5, dated May 21, 2014.
European Search Report for EP 12 17 0492, dated Mar. 18, 2013.

* cited by examiner

DEVICE AND METHOD FOR MANUFACTURING CONTAINERS

CROSS-REFERENCE TO RELATED APPLICATIONS

The present application claims the benefit of priority of German Application No. 102011079273.2, filed Jul. 15, 2011. The entire text of the priority application is incorporated herein by reference in its entirety.

FIELD OF THE DISCLOSURE

The disclosure relates to a device and method for the manufacture of containers.

During the manufacture of containers in blow-molding machines thermal energy is required by various consumers (consumer points). For example, preforms have to be preheated by means of temperature stabilizing devices before being blow-molded for forming finished containers. On the other hand compressed-air generators are necessary, which produce waste heat, which has to be dissipated to ensure correct functioning of the compressed-air generators.

So far the cooling systems of compressors or the stretch blow-molding machine and the temperature stabilizing equipment of the stretch blow-molding machine have been operated separately. All operate independently.

SUMMARY OF THE DISCLOSURE

One aspect of the disclosure is to provide a thermal energy combination, which saves energy for heating and cooling.

With the embodiment according to the disclosure it is possible to reduce the primary energy to be used for heating and/or cooling in the manufacturing process, in that the individual consumers and the generators of thermal energy are connected together through a thermal energy combination for thermal management, so that waste heat can be recycled and/or cold media used many times over.

BRIEF DESCRIPTION OF THE DRAWINGS

Embodiments of the disclosure are described in the following in more detail based on the drawings. The following are shown.

DETAILED DESCRIPTION

Figure 1:
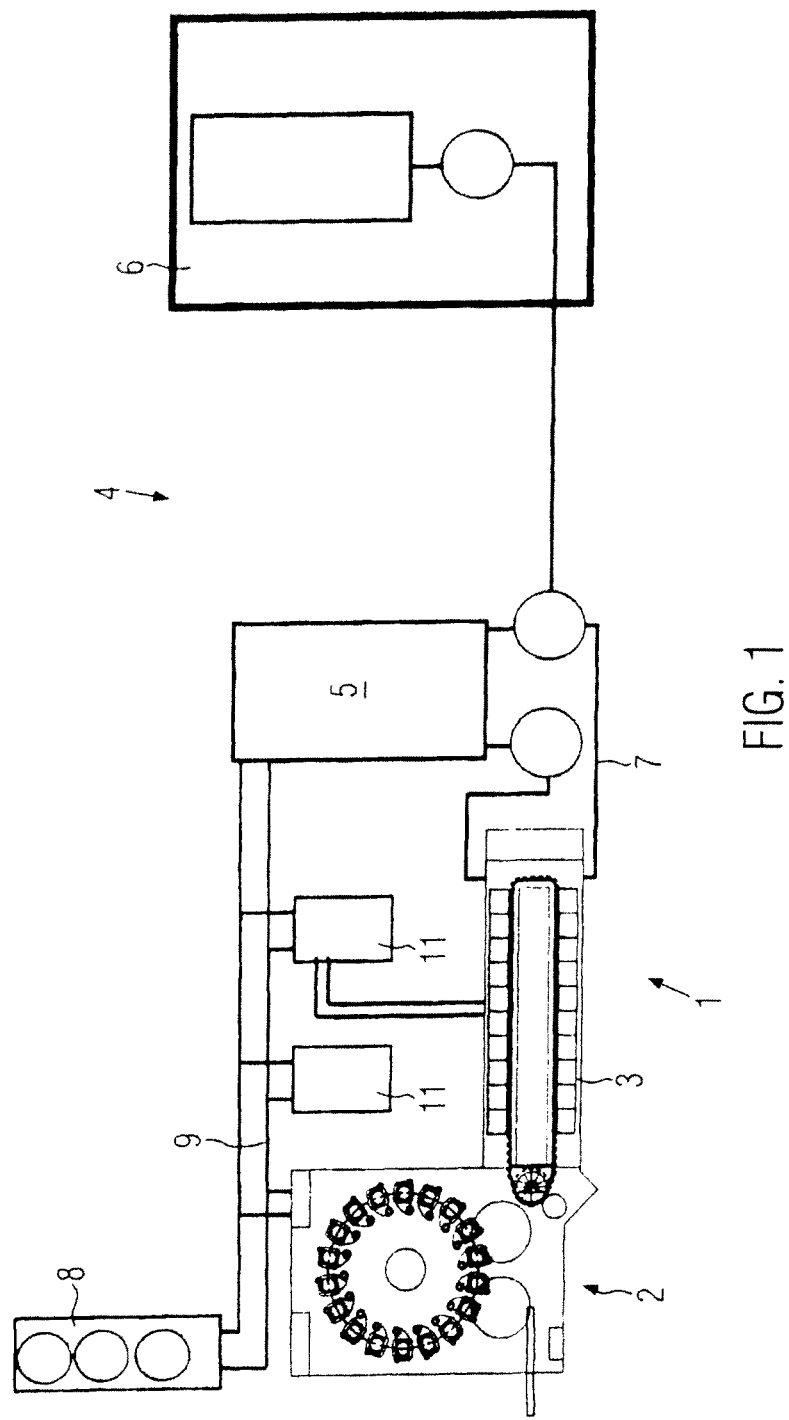
FIG. 1 a first embodiment of the disclosure, and
FIG. 2 a second embodiment of the disclosure.

FIG. 1 shows an extremely schematized illustration of a device 1 for the manufacture of containers, which in the illustrated embodiment is a stretch blow-molding system for the manufacture of plastic containers from so-called preforms and forms the actual blow-molding machine 2 as a rotor, and contains a temperature stabilising device 3 for the preheating of preforms. Both the stretch blow-molding machine 2 and the preheating section 3 are of the usual construction and require primary energy for heating in the manufacturing process. The device 1 has furthermore a compressed-air generator 4 assigned to it, which in the illustrated embodiment has a reciprocating piston compressor or turbo compressor in the form of a booster 5 and a low-pressure generator 6. During the operation of the pressure generator 4 waste heat arises, which must be discharged from the pressure generation system. According to the disclosure the waste heat from the pressure generation device 4 is transferred via a thermal energy combination through heat exchangers or similar devices to a heat transfer medium, which in turn is passed through lines 7 into the pre-heating device 3 of the stretch blow-molding machine 1, where it is used for preheating preforms (e.g. during hot-fill or a similar process).

The stretch blow-molding machine 2 has furthermore a cooling device 8 assigned to it, which cools the finished containers using primary energy. The cooling medium, which still has cooling capacity, leaving the stretch blow-molding machine is passed through a line 9 assigned to the thermal energy combination to the pressure generation device 4, where it cools the cooling water of the compressor(s).

Figure 2:
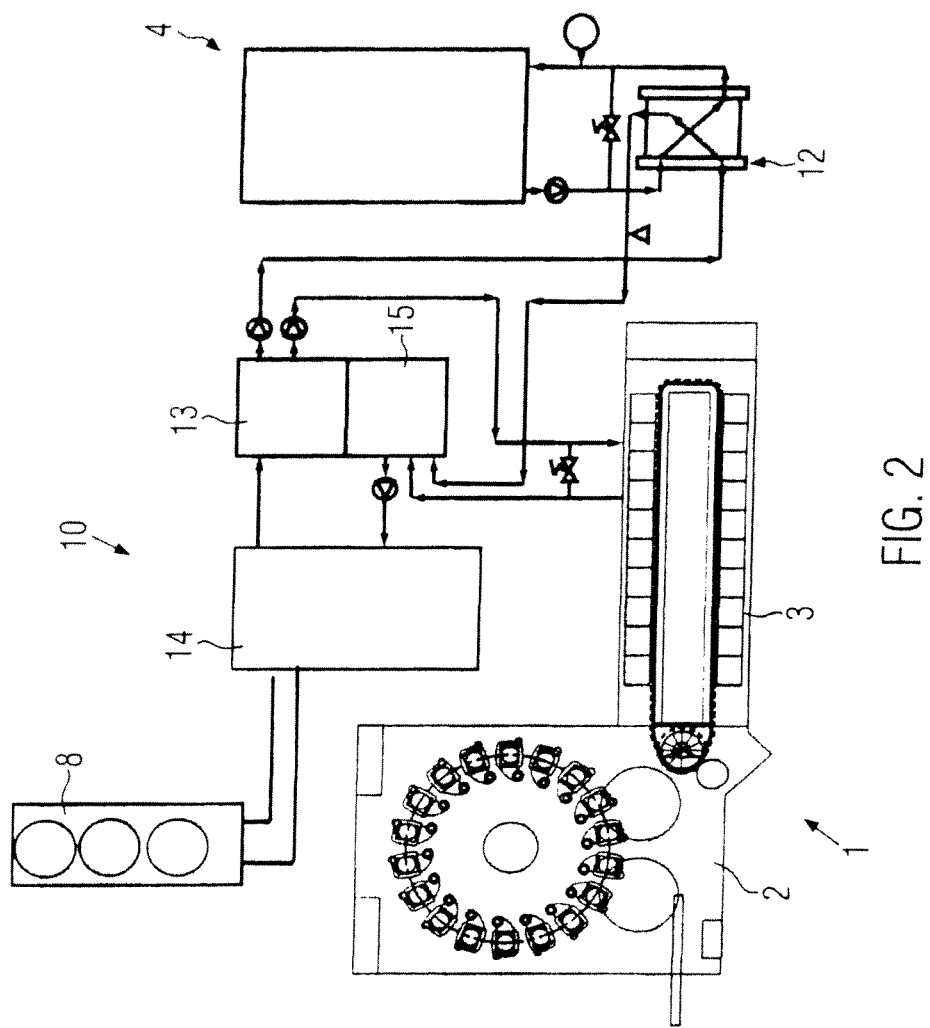

FIG. 2 illustrates a further embodiment of the disclosure, which however can be combined with the embodiment according to FIG. 1. FIG. 2 also illustrates the already described stretch blow-molding machine 2 with the preheating section 3, the compressed-air generator 4 and the cooler 8. In this embodiment the cooler 8 is part of a refrigeration plant 10, which, by using primary energy, cools various consumers, such as for example the stretch blow-molding machine 2, temperature stabilising equipment 11 (FIG. 1) and the compressed-air generator 4. A heat exchanger 12 is illustrated, which cools the cooling medium for the booster 5, for example from 30° C. to 20° C. The heat transfer medium of the heat exchanger 12, similarly water, originates from a storage tank 13, which is kept at 10° C. by the cooler 8 and a chiller 14 using primary energy. After passing through the heat exchanger 12 the heat transfer medium enters a cooling medium tank 15, which is maintained at 20° C., via the thermal energy combination. From this tank 15 cooling medium is drawn off into the chiller where it is cooled to 10° C. and thereafter the cooling medium is returned to the tank 13.

From the cooling medium tank 13 at 10° C., cooling medium for cooling the temperature stabilising equipment is drawn off, which is returned at 14° C. within the scope of the thermal energy combination to the cooling medium tank 15 again after the cooling process in the temperature stabilizing section 3.

Within the scope of the thermal energy management system it is furthermore possible to provide radiators or cooling towers, and to site them in surroundings where they do not lead to the heating of the immediate vicinity of the stretch blow-molding machine 2 or the preheating section 3.

Individual constituent parts of the device according to the disclosure, which are assigned to the thermal energy combination, for example the cooling system according to FIG. 2, can be combined to a spatial and functional energy module with a common control, and assigned to the consumers/generators of thermal energy. In this way for example one cooling device can be used for all cooling purposes, and thus replaces cooling devices, which have been so far provided for each individual operational component, i.e. the stretch blow-molding machine 2 and the preheating section 3 as well as the compressed air generator 4. This energy module can be adapted according to the version of stretch blow-molding machine, type of process and type of compressor.

Through the thermal energy combination according to the disclosure the waste heat in the cooling water from the machines can be used for other internal processes. The required machine equipment for this, such as for example heat exchangers, refrigerating plants, radiators and cooling towers are known to the person skilled in the art and do not need to be explained in more detail. The thermal combination can combine together the most different machines and facilities depending on the type of production system and is not restricted in particular to the given examples. For example, the temperature stabilization of the blow mold, utilization of the furnace exhaust, the cooling of the electrical stretching drive, the compressor waste heat or blow mold, preferential heating clamp, neck plate, base, drive cooling (electrical stretching, blow-wheel drive, chain drive), temperature stabilization of water load for microwave (if practicable), preheating of H2O2, temperature stabilization of blowing air (cold for container cooling, hot for sterile blowing air), cooling of filter discs for IR furnace, cooling of lamps, preform surface cooling, singly or in combination with others can be part of the thermal energy combination.

The invention claimed is:

1. A device for the manufacture of containers, comprising:
   a stretch blow-molding machine, a pressure generator, and a line for transfer of a cooling medium from the stretch blow-molding machine to the pressure generator, which are connected together through a thermal energy combination for thermal management, and
   wherein the thermal energy combination feeds the cooling medium from the stretch blow-molding machine to the pressure generator as cooling water.

2. The device according to claim 1, wherein the thermal energy combination includes facilities for recycling waste heat.

3. The device according to claim 1, wherein the thermal energy combination includes facilities for secondary utilization of cold media.

4. The device according to claim 1, further comprising:
   a heat generation facility serving the stretch blow-molding machine.

5. The device according to claim 1, further comprising:
   a refrigeration facility serving the stretch blow-molding machine.

6. The device according to claim 1, wherein the thermal energy combination feeds cooling water from the pressure generator to the stretch blow-molding machine to heat a temperature stabilizing medium.

7. The device according to claim 1, wherein the thermal energy combination includes an energy module with a plurality of facilities utilized by the pressure generator.

8. The device according to claim 7, wherein the plurality of facilities include heat exchanging facilities and refrigerating facilities.

9. The device according to claim 1, wherein the pressure generator includes a compressor.

10. The device according to claim 1, wherein the thermal energy combination comprises one or more of:
    a temperature stabilization of a blow mold;
    a furnace exhaust utilization;
    a cooling of an electrical stretching drive; and
    compressor waste heat.

11. The device according to claim 1, wherein the pressure generator has an associated pressure generator cooling water, and
    wherein the cooling medium cools the pressure generator by cooling the pressure generator cooling water.

* * * * *